US012713298B2

(12) United States Patent
Singh et al.

(10) Patent No.: US 12,713,298 B2
(45) Date of Patent: Aug. 18, 2026

(54) SIDE-HAUL TRANSPORT FOR UPLINK COORDINATED MULTIPOINT AND CARRIER AGGREGATION FOR REMOTE DISTRIBUTED UNITS IN A CELLULAR NETWORK

(71) Applicant: Rakuten Symphony, Inc., Tokyo (JP)

(72) Inventors: Satish Singh, Bangalore (IN); Prasad Hiremath, Bangalore (IN); Shanmukha Sreedhar Theerthala, Bangalore (IN); Laxmidhar Pradhan, Bangalore (IN); Deepak Shivanagouda Patil, Bangalore (IN)

(73) Assignee: Rakuten Symphony, Inc., Tokyo (JP)

( * ) Notice: Subject to any disclaimer, the term of this patent is extended or adjusted under 35 U.S.C. 154(b) by 315 days.

(21) Appl. No.: 18/524,779

(22) Filed: Nov. 30, 2023

(65) Prior Publication Data

US 2025/0184830 A1 Jun. 5, 2025

(51) Int. Cl.
*H04W 4/00* (2018.01)
*H04W 28/22* (2009.01)
*H04W 72/40* (2023.01)

(52) U.S. Cl.
CPC .......... *H04W 28/22* (2013.01); *H04W 72/40* (2023.01)

(58) Field of Classification Search
CPC ..... H04W 28/22; H04W 72/40; H04W 28/04; H04W 72/04; H04W 72/042; H04W 88/08; H04W 28/08; H04W 28/084; H04W 36/22; H04W 72/12; H04L 5/0035; H04L 5/0023; H04L 5/001; H04L 5/0007
See application file for complete search history.

(56) References Cited

U.S. PATENT DOCUMENTS 5,673,307 A * 9/1997 Holland .............. H04W 36/302 455/437
6,611,506 B1 * 8/2003 Huang .................. H04W 72/52 370/332
9,351,201 B2 * 5/2016 Ge .................. H04W 36/00692
2020/0229271 A1 * 7/2020 You ....................... H04W 72/23
2021/0153158 A1 * 5/2021 Agarwal ............... H04L 5/0048
2022/0086218 A1 * 3/2022 Sabella ................. H04M 15/66
2023/0044648 A1 * 2/2023 Centonza .............. H04W 36/22
2024/0049190 A1 * 2/2024 Hosseini ................. H04L 5/001
2024/0298194 A1 * 9/2024 Mueck ................... G06N 20/00

* cited by examiner

*Primary Examiner* — Phuongchau Ba Nguyen
(74) *Attorney, Agent, or Firm* — David R. Stevens; Stevens Law Group

(57) ABSTRACT

Carrier aggregation between remote DU in a cellular communication network is used to increase throughput to user equipment. In response to user equipment being located in cells of remote DUs, a physical link is created and a logical link between the cells of the DUs. The physical link may be an L2 or L3 network connection. Carrier aggregation is performed with transmission of data over the physical link while latency and status of the physical link is acceptable. A context may be used to facilitate the carrier aggregation, the context including identifiers of the cells as well as addresses (IP, MAC) of the DUs.

12 Claims, 8 Drawing Sheets

SIDE-HAUL TRANSPORT FOR UPLINK COORDINATED MULTIPOINT AND CARRIER AGGREGATION FOR REMOTE DISTRIBUTED UNITS IN A CELLULAR NETWORK

BACKGROUND

Field of the Invention

This invention relates to performing carrier aggregation using remote distributed units in a cellular communication network.

Background of the Invention

Cellular communication networks rely on the ability to re-use the electromagnetic spectrum repeatedly throughout the network. Specifically, the range of signals transmitted within a first cell is limited such that a second, non-neighboring cell may transmit and receive signals using the same frequencies as the first cell without creating significant interference. The re-use of the electromagnetic spectrum may further be enhanced by using beam-forming.

It is often the case that user equipment (UE) is located within range of multiple cells simultaneously. Modern cellular communication protocols, such as fifth generation/new radio (5G/NR) or earlier protocols, such as 4G/LTE. The throughput to the UE may be enhanced by performing "carrier aggregation" (CA) and/or uplink coordinated multipoint (ULCoMP) in which the UE simultaneously sends and receives data with respect to multiple cells. In prior approaches, the multiple cells used to perform carrier aggregation are implemented by a common distributed unit (DU) or by co-located DUs and corresponding central unit (CU) that implement the carrier aggregation and/or ULCoMP.

SUMMARY OF THE INVENTION

In one aspect of the invention, a system includes a cellular communication network including a first node and a second node, the first node and the second node being remote from one another, the first node implementing one or more first cells and the second node implementing one or more second cells. The first node may be configured to detect user equipment located within the one or more first cells and within the one or more second cells. The first node further establishes one or more logical links between the one or more first cells and the one or more second cells. The first node performs carrier aggregation with respect to data transmitted from a central unit remote from the first node and the second node over a physical link between the first node and the second node using the one or more logical links.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
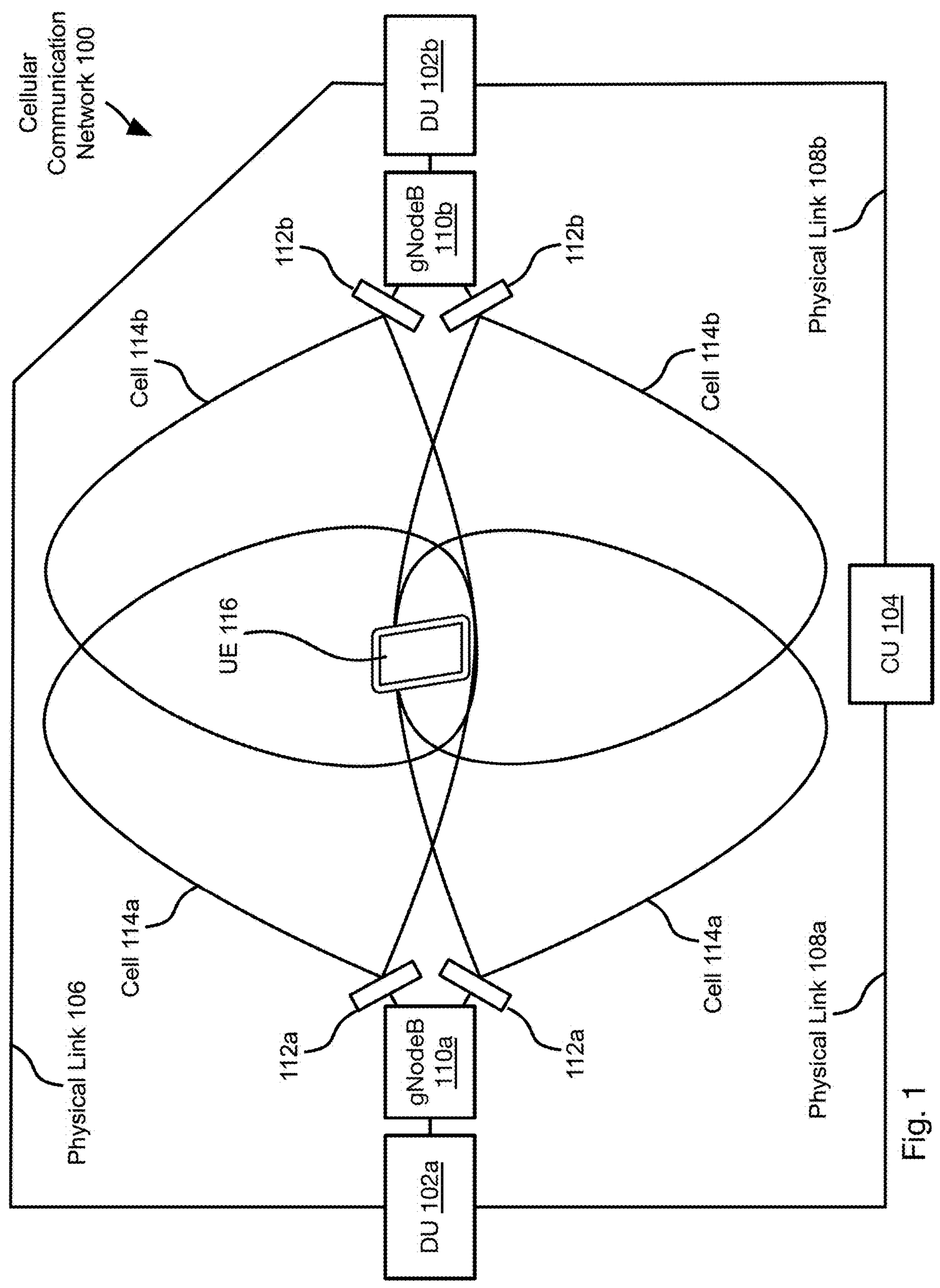
FIG. 1 is a diagram illustrating user equipment in a cellular communication network including multiple overlapping cells.

FIG. 1 illustrates an example cellular communication network 100 including a plurality of distributed units (DU) 102*a*, 102*b* and one or more central units (CU) 104. The DUs 102*a*, 102*b* and CU 104 may be implemented as a computing device, such as a computing device 600 as described below. The DUs 102*a*, 102*b* and CU 104 may perform any of the functions defined for DUs and CUs according to the OPEN RAN specification or any other cellular communication standard.

The DUs 102*a*, 102*b* are connected to one another by a physical link 106 and are connected to the CU 104 by physical links 108*a*, 108*b*. The physical links 106, 108*a*, 108*b* may be implemented as wires, fiber optic cables, microwave connections, or other medium. The physical links 106, 108*a*, 108*b* may include one or more intervening network elements, such as routers, switches, servers, or the like. DUs 102*a*, 102*b* and CU 104 may communicate over the physical links 106, 108*a*, 108*b* according to any networking protocol known in the art, such as transmission control protocol (TCP), user datagram protocol (UDP), or the like. The DUs 102*a*, 102*b* and CU 104 may connect to one another using a level 1 (L1), level 2 (L2), or higher level of networking protocol.

Each DU 102*a*, 102*b* is coupled to a baseband unit that manages sending and receiving of radio signals. For example, the baseband unit may be implemented as a gNodeB 110*a*, 110*b* according to the 5G/NR standard. Each gNodeB 110*a*, 110*b* may be coupled to one or more antennas 112*a*, 112*b*. Each antenna 112*a*, 112*b* has one or more corresponding cells 114*a*, 114*b*. Each cell 114*a*, 114*b* has a corresponding identifier, a range of carrier frequencies, and a coverage area such that a UE 116 located within the coverage area of a cell 114*a*, 114*b* is able to establish a cellular radio connection to the antenna 112*a*, 112*b* defining the cell 114*a*, 114*b* using the range of carrier frequencies defined for the cell 114*a*, 114*b*. As shown in FIG. 1, a DU 102*a*, 102*b* may be coupled to a gNodeB 110*a*, 110*b* defining multiple cells 114*a*, 114*b*.

As shown in FIG. 1, a UE 116 may be simultaneously located within the cells 114*a*, 114*b* of multiple DUs 102*a*, 102*b*. In such instances, the UE 116 may communicate using carrier aggregation (downlink to the UE 116) and uplink coordinated multipoint (uplink from the UE 116), referred to herein as CA/ULCoMP, to increase throughput. Using the approach described herein, DUs 102*a*, 102*b* that are remote from one another may be used together to implement carrier aggregation. In the approach described herein, the CU 104 may be considered to be remote from the DUs 102*a*, 102*b*.

As used herein "remote from" may be understood as meaning some or all of (a) not located within the same cellular communication tower, (b) not mounted within a common chassis (e.g., server rack), (c) connected by a networking connection and carrier medium that is adapted for long range (e.g., greater than 50 meters) communication, such as a fiber optic cable, ethernet cable, microwave communication link, or the like, (d) communicating using an L2 or L3 networking protocol, (e) separate by at least 50 meters, (f) not connected by a short range carrier medium and protocol, e.g., small computer system interface (SCSI), peripheral component interconnect express (PCIe), serial attached SCSI (SAS), universal serial bus (USB), or the like.

Figure 2A:
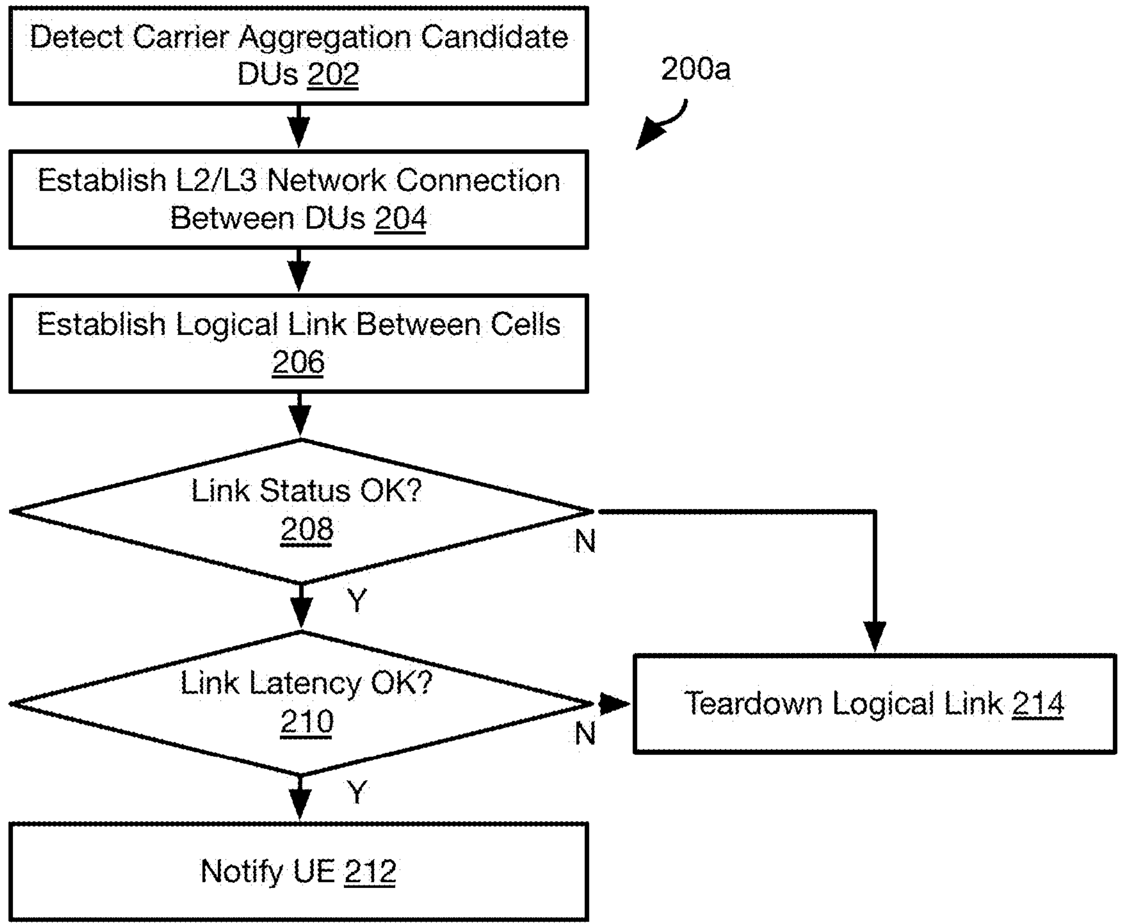
FIG. 2A is a process flow diagram of a method for establishing a link for implementing carrier aggregation between remote DUs in accordance with an embodiment.

FIG. 2A illustrates a method 200*a* for performing CA/ULCoMP with respect to multiple DUs 102*a*, 102*b* that are remote from one another. The method 200*a* may be performed by one of the DUs 102*a*, 102*b*, the DU 102*a* is presumed in the following description.

The method 200*a* may include detecting 202 that a pair of DUs 102*a*, 102*b* are aggregation candidates. Detecting 202 that a pair of DUs 102*a*, 102*b* are aggregation candidates may include the DU 102*a* receiving a report including an identifier of a cell 114*b* of another DU 102*b* from the UE 116. The report may, for example, include a new radio cell global identifier (NCGI) of the cell 114*b*. The report may identify the DU 102*b* or may be resolved by the DU 102*a* to obtain an identifier of the DU 102*b*, such as by querying a remote database storing associations between NCGIs and corresponding DUs.

The method 200*a* may include establishing 204 an L2 or L3 (L2/L3) network connection between the DU 102*a* and the DU 102*b* detected at step 202. The L2/L3 network connection may, for example, include a connection according to an L2/L3 protocol over the physical link 106, such as link layer discovery protocol (LLDP), cisco discovery protocol (CDP), internet protocol route (IP Route), forwarding database (FDB), address resolution protocol (ARP), multilink trunking protocol (MLT), controller area network (CAN), point-to-point protocol (PPP), or other L2/L3 protocol. The L2/L3 network connection may be implemented using addresses, e.g., internet protocol (IP) addresses of the DU 102*b*, which may likewise be obtained from a central database using the NCGI received by the DU 102*a*.

The method 200*a* may include establishing 206 a logical link between the DUs 102*a*, 102*b*. The logical link may be a link defining an association between a cell 114*a* of the DU 102*a* and a cell 114*b* of the DU 102*b*. The logical link may be understood as defining a transport session between a cell 114*a* and a cell 114*b*. In some embodiments, where the UE 116 is located within multiple cells 114*a* and one or more cells 114*b*, a logical link may be created between each cell 114*a* and each cell 114*b* of the DU 102*b* within which the UE 116 is located. Accordingly, in the example of FIG. 1, there would be four logical links: one between a first cell 114*a* and a first cell 114*b*, a second between the first cell 114*a* and a second cell 114*b*, a third between a second cell 114*a* and the first cell 114*b*, and a fourth between the second cell 114*a* and the second cell 114*b*.

Establishing 206 a logical link between cells of the DUs 102*a*, 102*b* may be performed by associating a context with the logical link, the context may include identifiers (e.g., NCGI) of the cells 114*a*, 114*b* of the logical link, IP addresses of the DUs 102*a*, 102*b*, identifiers of the DUs 102*a*, 102*b*, and/or media access control (MAC) addresses of the DUs 102*a*, 102*b*. Establishing 206 a logical link may therefore include each DU 102*a*, 102*b* transmitting its corresponding NCGI, IP address, MAC address, DU identifier to the other DU 102*b*, 102*a*, such as in response to detecting 202 the CA/ULCoMP candidate. The context may be used by one DU 102*a*, 102*b* to map data addressed to a particular cell 114*a*, 114*b* to a network address (MAC and/or IP) such that the data can be sent to another DU 102*b*, 102*a* over the L2/L3 network connection.

The method 200*a* may include evaluating 208 whether the status of the physical link is acceptable, e.g., connectivity exists by way of the physical link. The method 200*a* may include evaluating 210 latency of the physical link. The physical link may include network components and paths that are used by other DUs and therefore there is a possibility that the physical link may become congested. Step 210 may include sending a ping, heartbeat message, or other message in order to measure round trip time (RTT) of the physical link between the DUs 102*a*, 102*b*. Step 210 may include evaluating whether the latency is below a latency threshold. The latency threshold may, for example, be on the order of 1 to 100 microseconds, such as between 30 and 50 microseconds, or between 35 and 40 microseconds. Steps 208 and 210 may be performed using two-way active measurement protocol (TWAMP)

If the physical link has an acceptable status and latency below a threshold, the method 200*a* may include notifying 212 the UE 116. Notifying 212 the UE may include notifying the UE 116 that the UE 116 will be participating in CA/ULCoMP with respect to the DUs 102*a*, 102*b*. The UE 116 will therefore be able to combine data received from the cells 114*a*, 114*b* of the DUs 102*a*, 102*b* into a single data stream. The manner in which the UE 116 participates in CA/ULCoMP with the DUs 102*a*, 102*b* may be according to any approach known in the art, such as according to the 5G/NR standard.

If the status is not acceptable or the latency is above the threshold, the method 200*a* may include tearing down 214 the logical link and possibly tearing down the L2/L3 network connection. Tearing down 214 the logical link may include ending any CA/ULCoMP between the DUs 102*a*, 102*b* with respect to one or more UEs 116 and ending any L2/L3 connectivity between the DUs 102*a*, 102*b*.

In some instances, logical links are created between DUs 102*a*, 102*b* and any number of UEs 116 located within the cells 114*a*, 114*b* referenced by the logical link may use the same logical link to perform CA/ULCoMP. There may be multiple logical links using the same physical links between DUs 102*a*, 102*b*, e.g., different combinations of cells 114*a*, 114*b* of the DUs 102*a*, 102*b* may have different logical links associated with the same physical link between the DUs 102*a*, 102*b*.

Once no UEs are using the logical link to perform CA/ULCoMP, the logical link may be torn down. Likewise, when no logical links are present that require the L2/L3 network connection, the L2/L3 network connection may also be torn down.

Figure 2B:
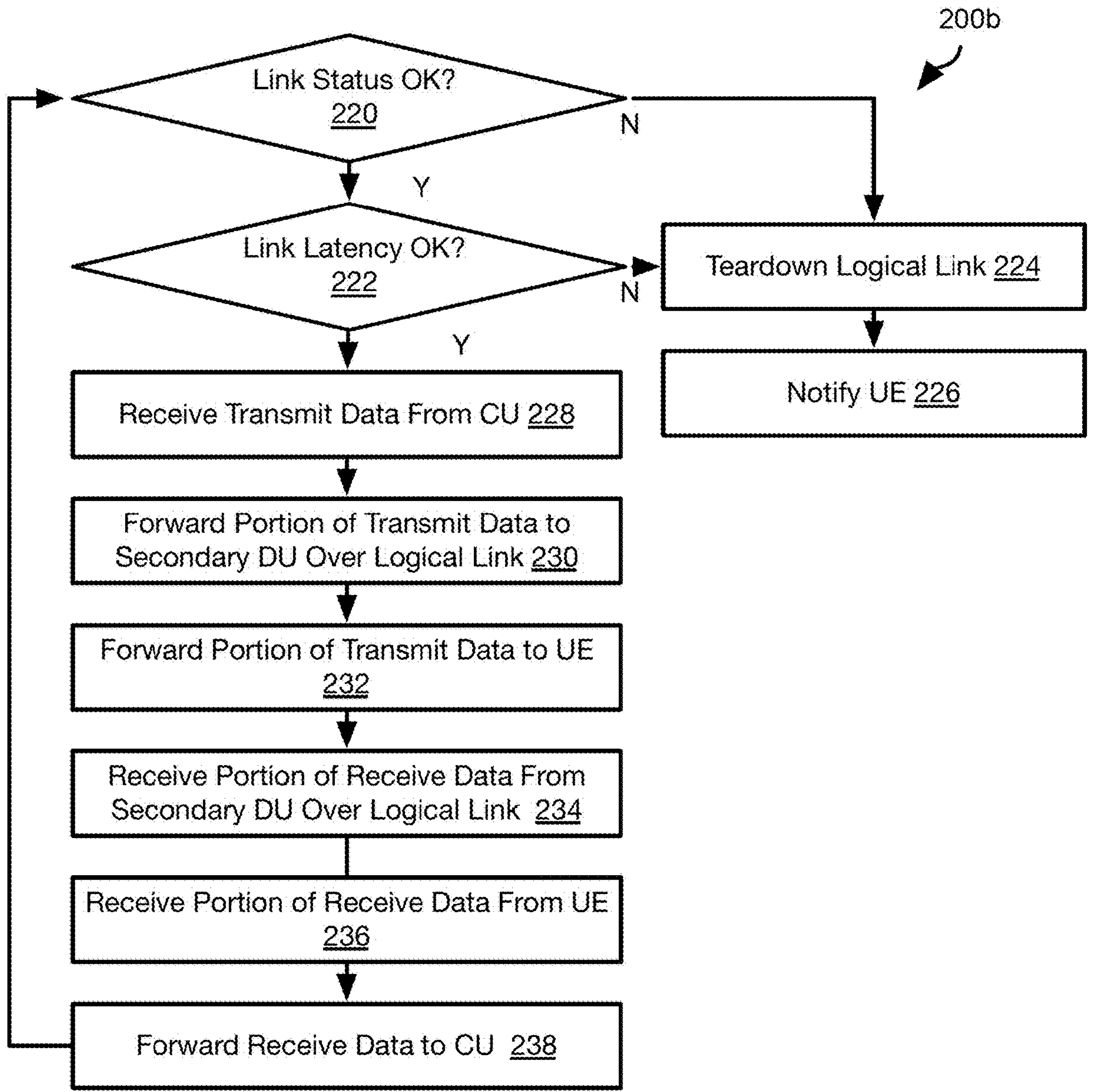
FIG. 2B is a process flow diagram of a method for transferring data between primary and secondary DUs during carrier aggregation in accordance with an embodiment.

FIG. 2B illustrates a method 200*b* that may be performed by a DU 102*a*, 102*b* following setup of CA/ULCoMP according to the method 200*a*. The method 200*b* is performed by a DU 102*a*, 102*b* that is the primary DU with one or more other DUs functioning as secondary DUs. In the description below, the DU 102*a* is the primary DU with the DU 102*b* being the secondary DU. The selection of the primary DU may be performed randomly or based on some criteria, such as whichever DU has the lowest DU identifier.

The method 200*b* may include evaluating 220 the status of the physical link 106 and the latency 222 of the physical link 106 as described above with respect to steps 208 and 210. If the status is not acceptable or the latency is above the latency threshold, the logical link may be torn down 224 as described above with respect to step 214 and the UE 116 may be notified 226 that CA/ULCoMP has ended. Thereafter, the UE 116 will receive data from only one of the DUs 102*a*, 102*b*. The DU 102*a*, 102*b* selected after teardown may be determined using any approach for establishing cellular communication connections and performing handoffs as known in the art.

If the link status is found to be acceptable and the link latency is at or below the latency threshold, the remaining steps of the method 200*b* may be performed. For example, data transmission to the UE 116 (e.g., CA) may be performed by the primary DU 102*a* receiving 228 data transmitted by the CU 104 over the link 108*a*. Receiving 228 the data may include receiving a plurality of data packets. The primary DU 102*a* forwards 230 a first portion of the data, e.g., a first portion of the packets, to the secondary DU 102*b* over the L2/L3 network connection in association with the logical link. For example, packets may be labeled with an identifier of the logical link or otherwise indicate the context (e.g., NCGIs) of the logical link. The secondary DU 102*b* will then forward the first portion of the data to the UE 116 using one or more cells 114*b* associated with one or more logical links to the primary DU 102*a*.

The primary DU 102*a* forwards a second part of the data to the UE 116, e.g., a second portion of the packets, using one or more cells 114*a* associated with the one or more logical links to the primary DU 102*a*. The UE 116 will then assemble the first data and the second data to obtain the data as transmitted by the CU 104, e.g., reorder and interleave the packets of the first and second portions to obtain the data as transmitted by the CU 104.

Not that there may be any number of DUs 102*b* that participate in CA such that the data from the CU 104 may be divided into three, four, or more portions transmitted to two, three, or more secondary DUs 102*b* with which the primary DU 102*a* has established logical links according to the method 200*a*.

Processing of data received from the UE 116, e.g., ULCoMP, may include receiving 234 a first portion of data received from the UE 116 from the secondary DU 102*b*, i.e., data transmitted by the UE 116 to the secondary DU 102*b* within the context of ULCoMP. The first portion of the received data may be transmitted over the physical link 106 between the DUs 102*a*, 102*b* in association with one or more logical links between the DUs 102*a*, 102*b*.

A second portion of data received from the UE 116 is received 236 by the primary DU 102*a* directly from the UE 116 through one of the cells 114*a* of the primary DU 102*a* associated with the one or more logical links to the secondary DU 102*b*. There may be any number of DUs 102*b* that participate in ULCoMP such that the data received from the UE 116 may be received from three, four, or more secondary DUs 102*b*.

The primary DU 102*a* uses the association of the data with the logical links to determine an association between the first portion and second portion (or a plurality of first portions from multiple secondary DUs 102*b* and the second portion) and, in response, aggregates the first portion and the second portion to obtain receive data for the UE 116 and forwards 238 the receive data to the CU 104 over the link 108*a*. Assembling the first portion and second portion may include interleaving and reordering packets received from the UE 116 directly and by way of the secondary DUs 102*b* to obtain the receive data. Alternatively, the packets composing the receive data may simply be forwarded to the CU 104 upon receipt with the CU 104 performing any reordering.

Figure 3A:
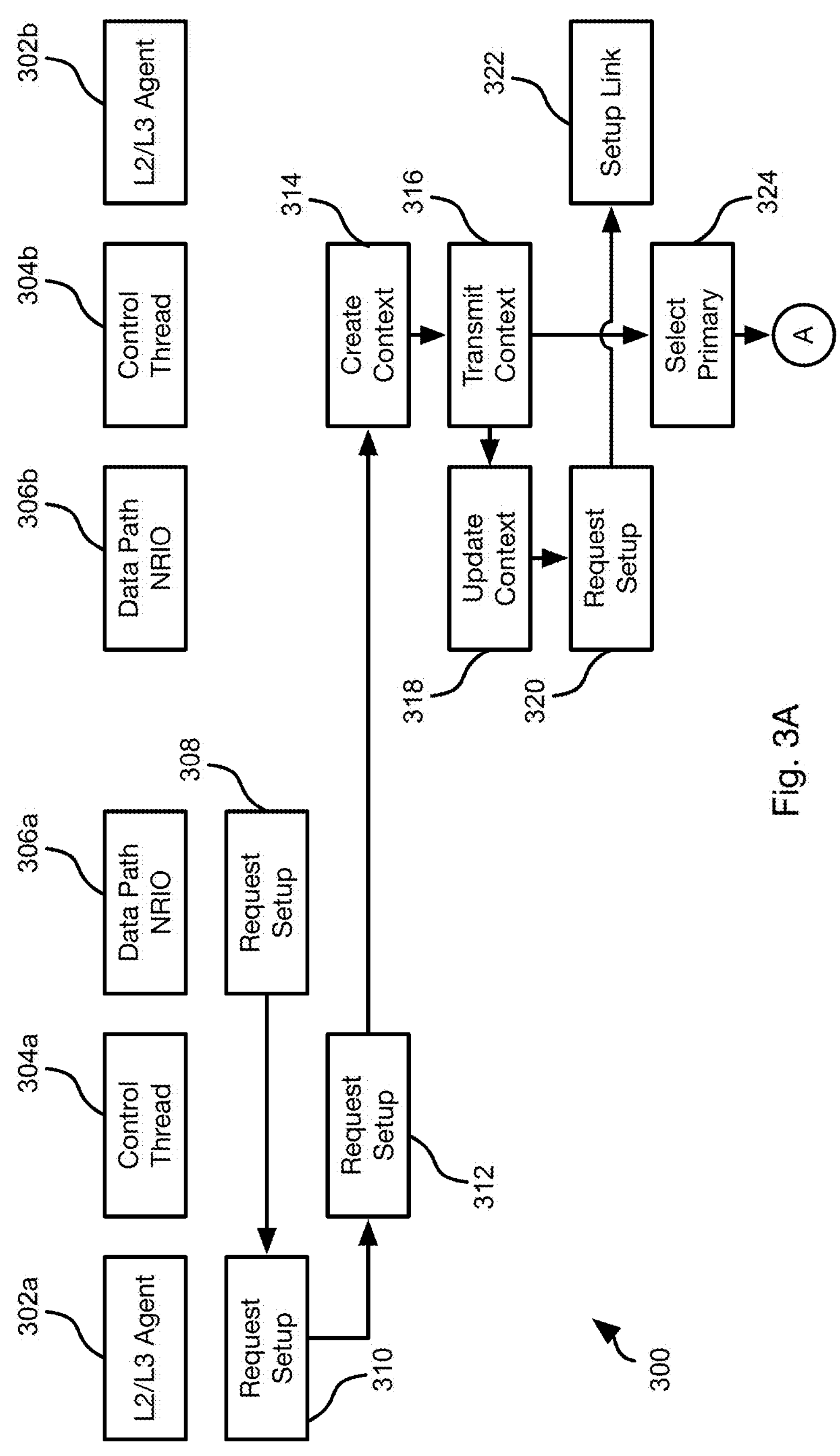
FIGS. 3A and 3B are a process flow diagram of a method for establishing a logical link between cells of DUs for performing carrier aggregation in accordance with an embodiment.
Figure 3B:
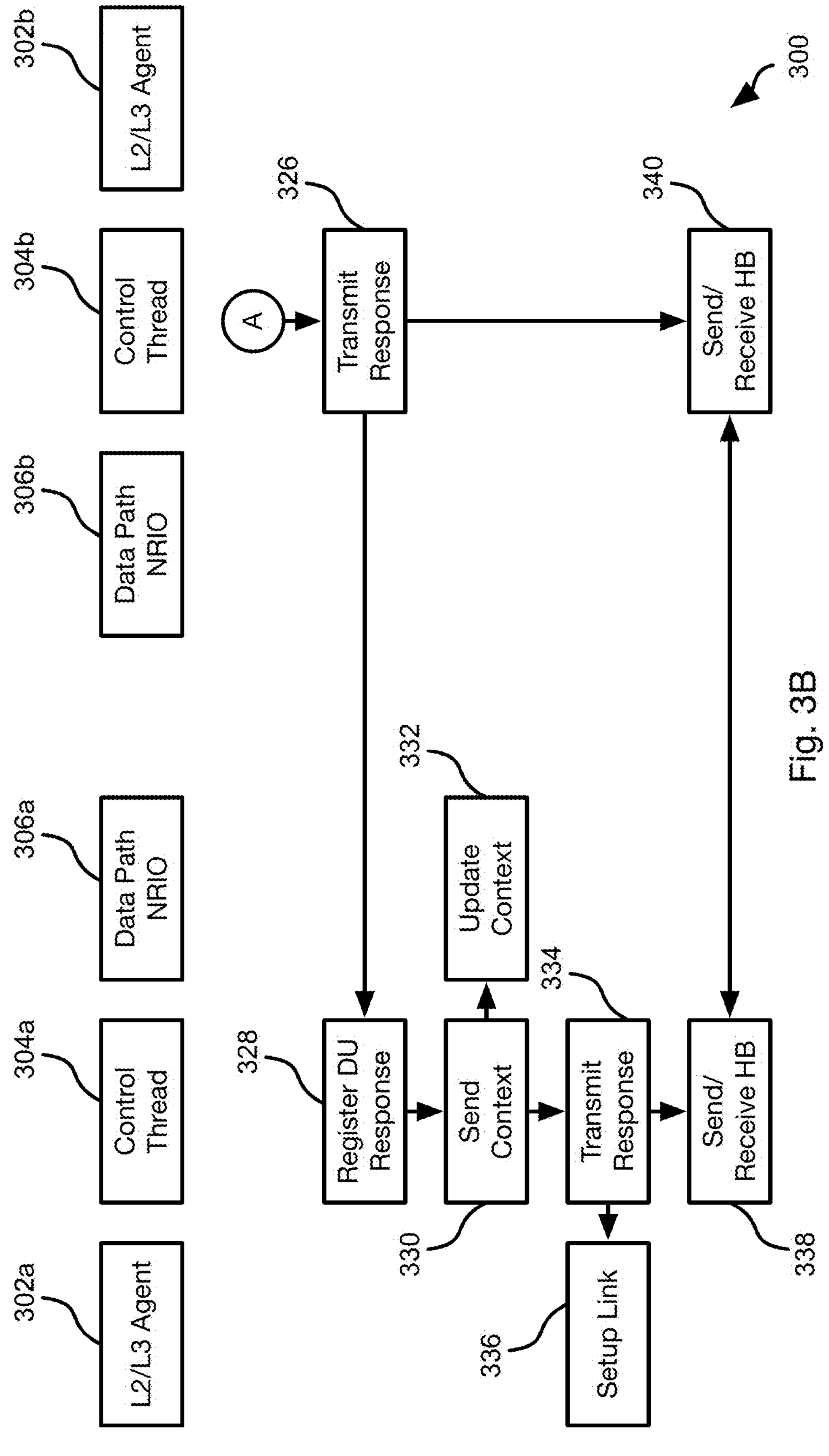

FIGS. 3A and 3B illustrate a method 300 for setting up an L2/L3 network connection and a logical link between DUs 102*a*, 102*b*. The method 300 may therefore be used to implement steps 204 and 206 of the method 200*a*.

The method 300 may be executed by an L2/L3 agent 302*a*, control thread 304*a*, and a data path new radio input/output (NRIO) module 306*a* executing on the DU 102*a* and an L2/L3 agent 302*b*, control thread 304*b*, and a data path new radio input/output (NRIO) module 306*b* executing on the DU 102*b*. The data path new NRIO modules 306*a*, 306*b* may implement level 1 (L1) connectivity, such as MAC layer connectivity between the DUs 102*a*, 102*b* and between the DUs 102*a*, 102*b* and the UE 116. The L2/L3 agents 302*a*, 302*b* may be agents implementing any L2/L3 network protocol known in the art.

The data path NRIO 306*a* requests 308, from the L2/L3 agent 302*a*, setup of CA/ULCoMP with a cell 114*b* of the DU 102*b*. Step 308 may be performed in response to detecting availability of CA/ULCoMP using the DU 102*b*. The manner in which the availability of CA/ULCoMP may be performed in any approach in the art. In particular, in some embodiments, the data path NRIO 306*a* may function according to any implementation of the 5G/NR standard known in the art and need not be adapted to implement the functions described herein. The request of step 308 may include information such as an identifier (e.g., NCGI) of a cell 114*a* of the DU 102*a* in which a UE 116 is located, an identifier of a cell 114*b* of the DU 102*b* in which the UE 116 is also located, an IP address of the DU 102*a*, and an IP address of the DU 102*b*, and/or an identifier of the DU 102*b*.

In response to the request from step 308, the L2/L3 agent 302*a* sets up a L2/L3 network connection with the DU 102*b*, if one does not already exist. The L2/L3 agent 302*a* further requests 310 setup of a logical link by a control thread 304*a*. The control thread 304*a* may be an instance of an application executing on the DU 102*a* whose function is to implement the logical links between the DU 102*a* and another DU 102*b* in order to implement CA/ULCoMP between remote DUs according to the approach described herein. The request from step 310 may include some or all of the information from step 308 and may additionally include a MAC address of the DU 102*a*.

In response to the request 310, the control thread 304*a* transmits 312 a request to the control thread 304*b* of the DU 102*b* to set up a logical link with the DU 102*a*. The request of step 312 may include some or all of the information from the request from step 310.

In some embodiments, the control thread 304*b* may further obtain a MAC address of the DU 102*b* if not already known. The control thread 304*a* may obtain the MAC address of the other DU 102*b* by sending a ping to the IP address of the DU 102*b*. The control thread 304*a* may further store a context defining the logical link between the DUs 102*a*, 102*b* for the cells 114*a*, 114*b* identified in the request of step 310. The context may include some or all of the information from the request of step 310 along with the MAC address of the DU 102*b*.

In response to the request 312, the control thread 304*b* creates a context, the context being a data structure defining the logical link between the DUs 102*a*, 102*b* for the cells 114*a*, 114*b* identified in the request of step 312. The context may include some or all of the information from the request of step 312. The context may include the MAC address of the DU 102*a* obtained from the request of step 312 or obtained by sending a pink to the DU 102*a*.

The context may be transmitted 316 to the data path NRIO 306*b* and used by the data path NRIO 302*b* to update 318 a context used for CA/ULCoMP with the DU 102*a*. The data path NRIO 302*b* may request 320, from the L2/L3 agent 302*b*, setup of a L2/L3 network connection between the L2/L3 agent 302*b* and the L2/L3 agent 302*a*. The request of step 320 may include the IP address of the DU 102*a*, the MAC address of the DU 302*a*, or other information sufficient to enable the L2/L3 agent 302*a* to create the L2/L3 network connection in cooperation with the L2/L3 agent 302*a* according to a networking protocol, such as an L2/L3 protocol or other networking protocol. If an L2/L3 network connection does not already exist, The L2/L3 agent 302*b* may then setup 322 a L2/L3 network connection to the L2/L3 agent 302*a* in response to, and using the information in, the request from step 320. Note that in some embodiments, the MAC address used to setup 322 the L2/L3 network connection is not provided prior to step 322. In such cases, step 322 may include invoking a ping to the DU 102*a*, e.g., the IP address of the DU 102*a*, and receive the MAC address of DU 102*a* in response to the ping.

The control thread 316 may further select 324 which of the DUs 102*a*, 102*b* is to be the primary DU. As noted above, this may include selecting whichever of the DUs 102*a*, 102*b* has the lowest DU identifier or using some other criteria.

Referring to FIG. 3B, the method 300 may continue with the control thread 304*b* transmitting 326 a response to the control thread 304*a*, which registers 328 the response. Registering 328 the response may include setting up a data structure representing the logical link created by the method 300. The data structure may, among other things, be used to trigger transmission and receipt of heartbeat messages between the DUs 102*a*, 102*b* over the physical link 106 in order assess the status and latency of the physical link 106 as described above with respect to steps 208 and 210.

The control thread 304*a* may further send 330 the context for the logical link to the data path NRIO 306*a*. The data path NRIO 306*a* will then update 332 its own context to include the context for use in performing CA/ULCoMP. As noted above, the context may include some or all of the information included in the request of step 310. Specifically, the context stored by one or both of the data path NRIOs 306*a*, 306*b* may include IP addresses of the DUs 102*a*, 102*b*, MAC addresses of the DUs 102*a*, 102*b*, cell identifiers (e.g., NCGI) of cells 114*a*, 114*b* associated with the logical link, and identifiers of the DUs 102*a*, 102*b*. The context may additionally include identifiers of UEs 116 using the logical link for CA/ULCoMP. The data path NRIOs 306*a*, 306*b* may use the contexts to perform CA/ULCoMP, such as by performing the method 200*b*.

The method 300 may further include the control thread 304*a* transmitting 334 a response to the L2/L3 agent 302, the response being a response to the initial setup request received at step 310. The L2/L3 agent 302 may then setup 336 the L2/L3 network connection in response to the response from step 334 if an L2/L3 connection does not already exist.

Once the L2/L3 network connection is setup, the status and latency of the physical link 106 may be evaluated by periodically sending 338 a heartbeat message from the DU 102*a* to the DU 102*b* and possibly also sending 340 a heartbeat message from the DU 102*b* to the DU 102*a*. In some embodiments, only the primary DU 102*a*, 102*b* sends heartbeat messages and receives responses from the secondary DU 102*b*, 102*a*.

Following execution of the method 300, the L2/L3 network connection between the DUs 102*a*, 102*b* is setup and a logical link between the cells 114*a*, 114*b* of the DUs 102*a*, 102*b* are setup and available for use in performing CA/UL-CoMP.

In the method 300, any of the requests 310, 308, 312 may trigger a timer that may timeout if a response is not received within a timeout period. If a response is not received within a timeout period, the method 300 may end and CA/UL-CoMP between the DUs 102*a*, 102*b* is not performed.

Figure 4:
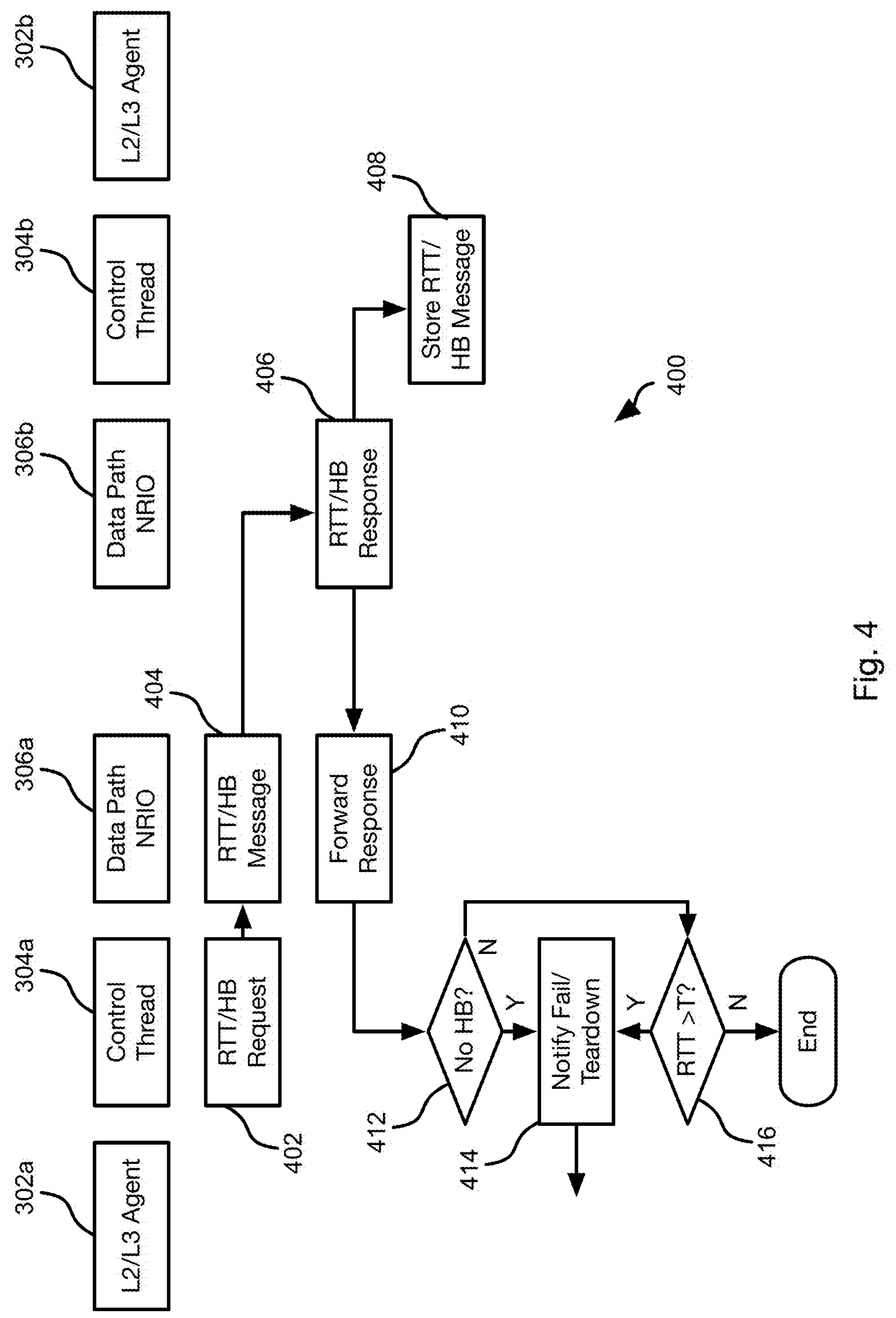
FIG. 4 is a process flow diagram of a method for monitoring links between DUs performing carrier aggregation in accordance with an embodiment.

FIG. 4 illustrates a method 400 that may be executed by the DUs 102*a*, 102*b*. The illustrated method 400 presumes that the DU 102*a* is the primary DU. The method 400 may be executed following setup of the L2/L3 network connection and one or more logical links between the DUs 102*a*, 102*b* between at least one cell 114*a* and at least one cell 114*b*. Inasmuch as all logical links between cells 114*a* and cells 114*b* use the same L2/L3 network connection, the method 400 may be performed once for all logical links using the same L2/L3 network connection with the results of the method 400 being used for all of the logical links.

In the method 400, the control thread 304*a* may request 402, from the data path NRIO 306*a*, measuring of round trip time (RTT) and detecting accessibility of the DU 102*b* using a heartbeat (HB) message. The request of step 402 may be a request to periodically measure RTT and detect accessibility.

In response to the request from step 402, the data path NRIO 306*a* transmits 404 an RTT/HB message to the data path NRIO 306*b*. Step 402 may further include adding a timestamp to the message, such as a 64-bit read time-stamp counter (RDTSC). The RTT/HB message may further include some or all of the items of information included in the context defining the one or more logical links, e.g., information stored at step 332. Alternatively, an identifier identifying the context or sufficient information to uniquely identify the context (e.g., NCGIs of the cell 114*a*, 114*b* of each logical link) may be included. Step 402 may further include clearing a loopback field of the RTT/HB message.

The data path NRIO 306*b* receives the RTT/HB message and evaluates the context included in or referenced by the RTT/HB message. If the context does not match a context stored by the data path NRIO 306*b*, the data path NRIO 306*b* may return a message to the data path NRIO 306*a* indicating this fact. For example, the data path NRIO 306*b* may set the loopback field of the RTT/HB message and return the RTT/HB message to the data path NRIO 306*a*. If the context does match a context stored by the data path NRIO 306*b*, the data path NRIO 306*b* may forward some or all of the information included in the RTT/HB message to the control thread 304*b*. For example, at least the timestamp and the context or a reference to the context.

The control thread 304*b* may store 408 some or all of the information from the RTT/HB message or a result of evaluating the RTT/HB message. For example, the timestamp and the context or a reference to the context may be stored. A result of evaluating the RTT/HB message may include a latency for the RTT/HB message, e.g., a difference between the time stamp and a time of receipt of the RTT/HB message. A result of evaluating the RTT/HB message may include a time difference between the timestamp and the timestamp of the preceding RTT/HB message.

The data path 306*b* may transmit 406 a response to the RTT/HB message to the data path NRIO 306*a*. The response may include a context or reference to the context and a timestamp indicating a time at which the response was transmitted, such as a 64-bit read time-stamp counter (RDTSC).

The data path NRIO 306*a* may forward 410 some or all of the information in the response to the control thread 304*a*, such as the timestamp and the context or a reference to the context.

The control thread 304*a* evaluates 412 whether a response to the RTT/HB request from step 402 is received within a timeout period from a time of performing step 402. If no response was received, the L2/L3 network connection may be torn down 414 and CA/ULCoMP between the DUs 102*a*, 102*b* may end. Step 414 may further include notifying the UE 116 that CA/ULCoMP has ended between the DUs 102*a*, 102*b*. Step 414 may further include notifying the L2/L3 agent 302*a* that the L2/L3 network connection is to be torn down. The notification may include identifiers of the DUs 102*a*, 102*b*, the cells 114*a*, 114*b* connected by one or more logical links over the physical link 106, or other information. The L2/L3 agent 302*a* may then proceed to tear down the L2/L3 network connection in cooperation with the L2/L3 agent 302*b*.

If a response to the RTT/HB request is received, i.e., the response forwarded at step 408, the method 400 may include evaluating 416 whether the RTT indicated by the response is greater than a threshold. For example, a difference between the timestamp of the response and the timestamp included in the RTT/HB message of step 402 may be calculated to obtain the RTT. If the RTT is greater than the threshold, then step 414 may be performed. Otherwise, the iteration of the method 400 may end. The method 400 may repeat periodically until either (a) the L2/L3 network connection is torn down at step 414 or (b) no UEs 116 are currently performing CA/ULCoMP using the DUs 102*a*, 102*b*.

Figure 5:
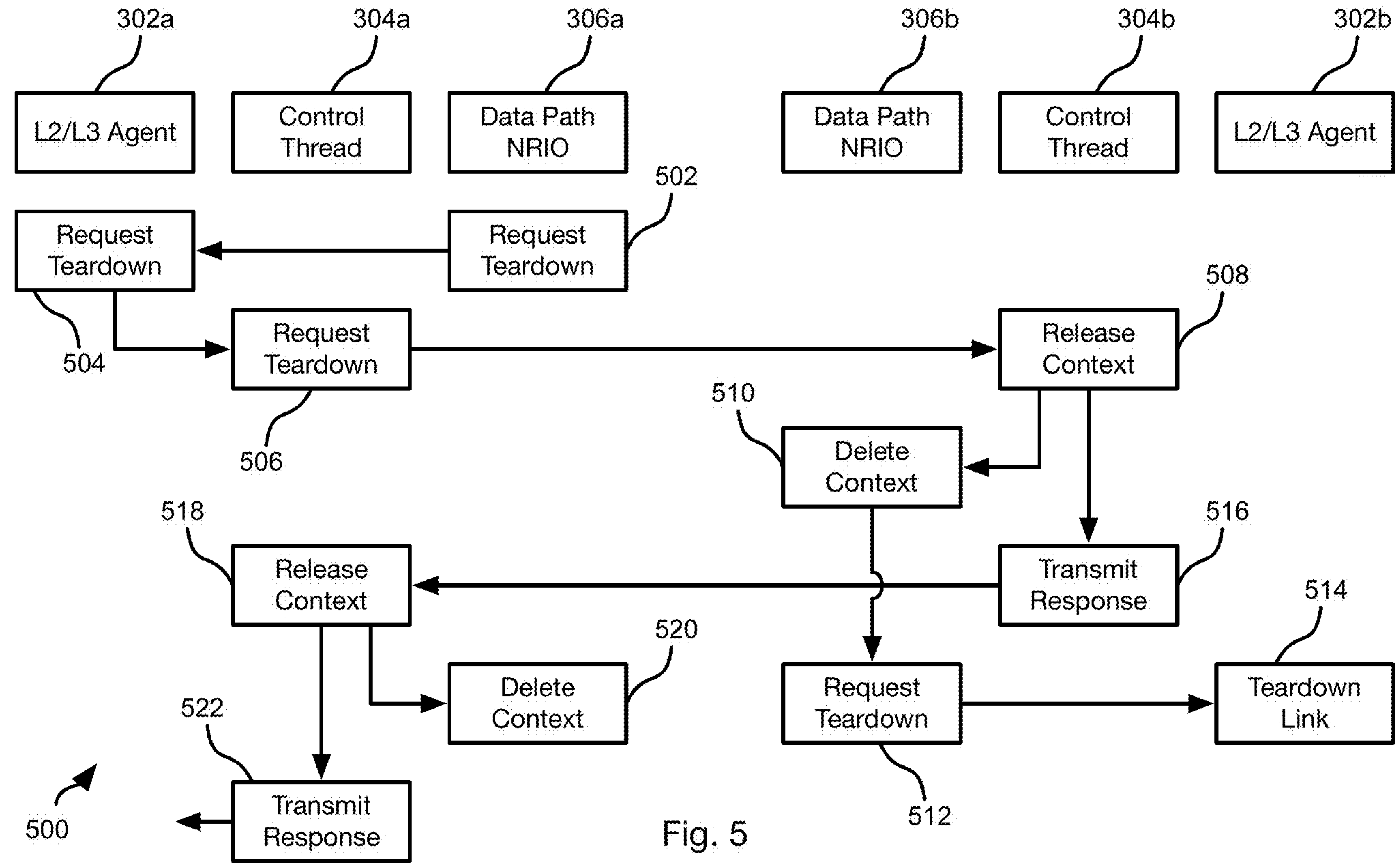
FIG. 5 is a process flow diagram of a method for tearing down links between DUs performing carrier aggregation in accordance with certain embodiments.

FIG. 5 illustrates an example method 500 for tearing down the L2/L3 network connection between DUs 102*a*, 102*b* and any corresponding logical links in order to free up computing resources. The method 500 may be executed as part of steps 224, 414 or in any other scenario where the L2/L3 network connection is to be torn down. The method 500 may presume that the DU 102*a* is the primary DU.

The method 500 may include the data path NRIO 306*a* requesting 502, by the L2/L3 agent 302*a*, teardown of a L2/L3 network connection. The request from step 502 may include sufficient information to identify the L2/L3 network connection, such as an identifier of the L2/L3 network connection, some or all of the items of information included in a context associated with the L2/L3 network connection, or a reference to the context. The data path NRIO 306*a* may request 502 the teardown in response to a lack of UEs 116 that need the L2/L3 network connection for performing CA/ULCoMP.

The L2/L3 agent 302*a* receives the request from step 302 and requests 504, from the control thread 304*a*, teardown of any corresponding logical links. The request from step 504 may include some or all of the information included in the request from step 502.

In response, the control thread 304*a* requests 506 teardown from the control thread 304*b*. Step 506 may include creating a teardown context and starting a timer that is used to detect timeout of the request 506. The request from step 506 may include the context of the one or more logical links or a reference to the context of the one or more logical links.

In response to the request from step 506, the control thread 304*b* releases 508 the context of the L2/L3 network connection and instructs the data path NRIO 306*b* to delete 510 the context for the L2/L3 network connection identified or included in the request from step 506. The data path NRIO 306*b* may further request 512 teardown of the L2/L3 network connection by the L2/L3 agent 302*b*. The L2/L3 agent 302*b* responds to the request from step 512 by tearing down 514 the link, possibly in cooperation with the L2/L3 agent 302*a*.

The control thread 304*b* may further transmit 516 a response to the request from step 506 to the control thread 304*a*. The response may acknowledge the request from step 506 and indicate that the context has been released and that the L2/L3 network connection is being torn down at the DU 102*b*. In response to the response from step 516, the control thread 304*a* may release 518 its context corresponding to the L2/L3 network connection and instruct the data path NRIO 306*a* to delete 520 the context. The control thread 304*a* may transmit 522 a response to the teardown request of step 504 to the L2/L3 agent 302*a*. In response, the L2/L3 agent 302*a* may complete teardown of the L2/L3 network connection in cooperation with the L2/L3 agent 302*b*.

If the control thread 304*a* does not receive a response from the control thread 304*b* within a timeout period, the control thread 304*a* may transmit a message to the L2/L3 agent 302*a* indicating that the request was not successfully completed. The L2/L3 agent 302*a* may then reattempt to tear down the L2/L3 network connection later on.

Note further that in the event that the L2/L3 agent 302*b* receives a request to teardown a L2/L3 network connection for which the L2/L3 agent 302*b* does not have a context, the L2/L3 agent 302*b* may simply acknowledge successful teardown.

In some embodiments, the process by which the L2/L3 agent 302*b* tears down the L2/L3 network connection may include repeating some or all of steps 504, 506, 508, 510, 512, 514, 516 with the roles of the DUs 102*a*, 102*b* being reversed.

Although the foregoing description emphasizes use of a network connection between DUs 102*a*, 102*b* for CA/ULCoMP, the network connection may be also be used for conveying any other network traffic between the DUs 102*a*, 102*b*, i.e., "sidehaul" traffic.

Figure 6:
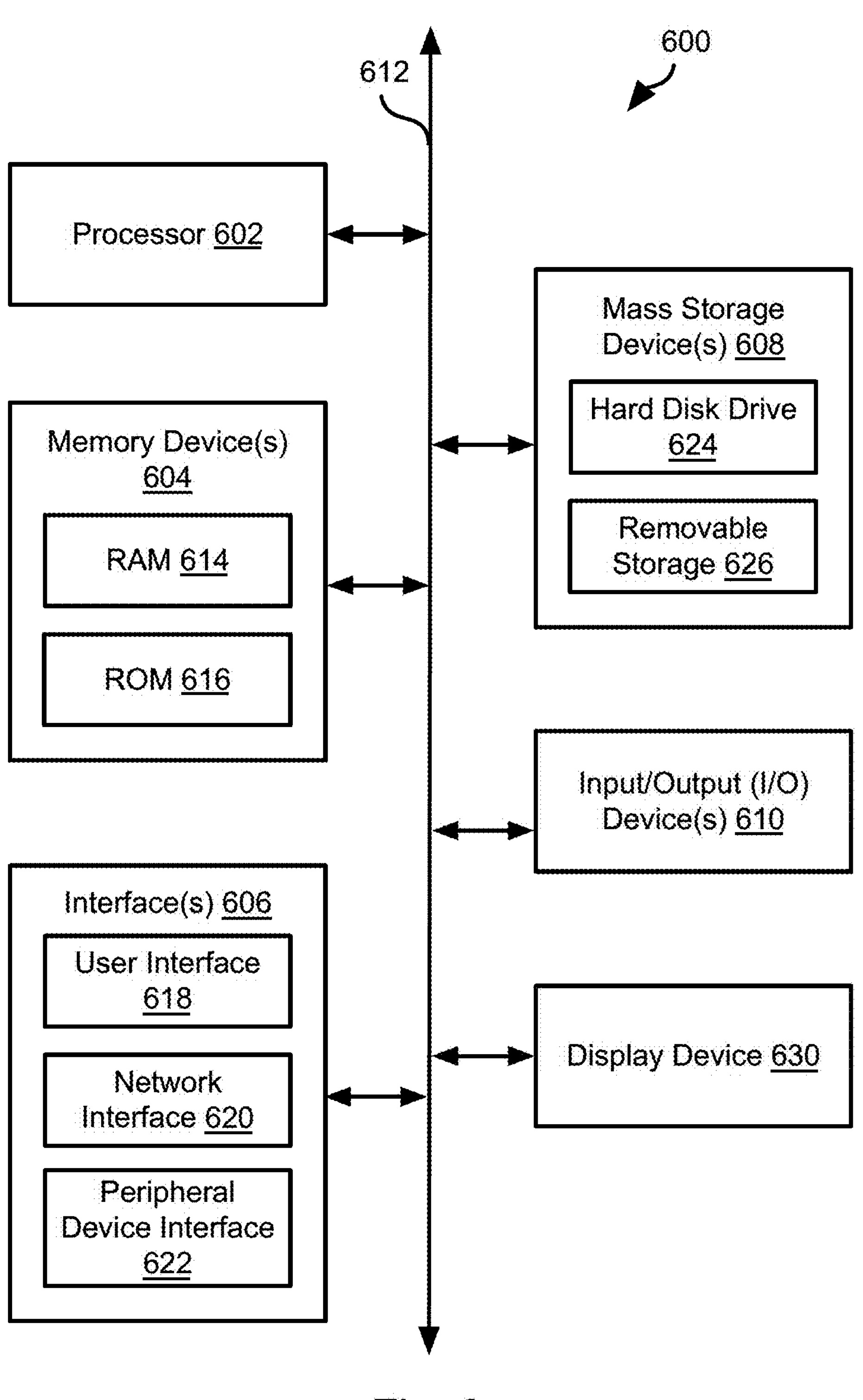
FIG. 6 is a schematic block diagram of an example computing device suitable for implementing methods in accordance with embodiments according to the disclosure.

FIG. 6 is a block diagram illustrating an example computing device 600. Computing device 600 may be used to perform various procedures, such as those discussed herein. The DUs 102*a*, 102*b*, CU 104, and user equipment 116 may have some or all of the attributes of the computing device 600.

Computing device 600 includes one or more processor(s) 602, one or more memory device(s) 604, one or more interface(s) 606, one or more mass storage device(s) 608, one or more Input/output (I/O) device(s) 610, and a display device 630 all of which are coupled to a bus 612. Processor (s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, lenses, CCDs or other image capture devices, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more peripheral interfaces such as interfaces for printers, pointing devices (mice, track pad, etc.), keyboards, and the like.

Bus 612 allows processor(s) 602, memory device(s) 604, interface(s) 606, mass storage device(s) 608, I/O device(s) 610, and display device 630 to communicate with one another, as well as other devices or components coupled to bus 612. Bus 612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system comprising:

a cellular communication network including a first node and a second node, the first node and the second node being remote from one another, the first node implementing one or more first cells and the second node implementing one or more second cells;

wherein the first node is configured to:

detect user equipment located within the one or more first cells and within the one or more second cells; and in response to the user equipment being located within the one or more first cells and within the one or more second cells:

establish one or more logical links between the one or more first cells and the one or more second cells;

create a physical link between the first node and the second node, the physical link being created as a level 2 (L2) or a level 3 (L3) network connection;

in response to latency of the physical link being below a threshold and a status of the physical link being acceptable, perform carrier aggregation with respect to data transmitted from a central unit over the physical link using the one or more logical links, the central unit being remote from the first node and the second node; and in response to the latency of the physical link being above the threshold and the status of the physical link being unacceptable, cease performing carrier aggregation over the physical link using the one or more logical links.

2. The system of claim 1, wherein the first node is configured to create a logical link between the first and second nodes by creating a context including at least one of:

identifiers of the one or more first cells and the one or more second cells;

internet protocol (IP) addresses of the first and second nodes; or media access control (MAC) addresses of the first and second nodes.

3. The system of claim 1, wherein the first node is further configured to create a logical link of the one or more logical links between each first cell of the one or more first cells and each second cell of the one or more second cells.

4. The system of claim 1, wherein the first node is configured to perform carrier aggregation by:

receiving the data from the central unit;

transmitting a first portion of the data to the second node to send to the user equipment over the physical link; and transmitting a second portion of the data to the user equipment using the one or more first cells.

5. The system of claim 1, wherein the first node is further configured to perform uplink coordinated multipoint (UL-COMP) by:

receiving first data from the second node over the physical link, the first data being received by the second node from the user equipment using the one or more second cells;

receiving second data by the first node using the one or more first cells; and transmitting the first and second data to the central unit.

6. The system of claim 1, wherein the first node is configured to invoke tearing down of the one or more logical links in response to the user equipment no longer being located in both of the one or more first cells and the one or more second cells.

7. A method comprising:

(a) detecting, by a first node, user equipment located within one or more first cells of a cellular communication network implemented by the first node and within one or more second cells of the cellular communication network implemented by a second node, the first and second nodes being remote from one another and connected by a physical link; and in response to (a):

establishing, by the first node, one or more logical links between the one or more first cells and the one or more second cells;

creating, by the first node, a network a level 2 (L2) or a level 3 (L3) network connection between the first node and the second node;

in response to latency of the physical link being below a threshold and a status of the physical link being acceptable, performing carrier aggregation with respect to data transmitted between the user equipment and a central unit, the carrier aggregation being performed over the physical link using the one or more logical links, the central unit being remote from the first node and the second node; and in response to the latency of the physical link being above the threshold and the status of the physical link being unacceptable, ceasing performing carrier aggregation over the physical link using the one or more logical links.

8. The method of claim 7, further comprising creating, by the first node, a context to facilitate performing carrier aggregation, the context including at least one of:

identifiers of the one or more first cells and the one or more second cells;

internet protocol (IP) addresses of the first and second nodes; or media access control (MAC) addresses of the first and second nodes.

9. The method of claim 7, further comprising, creating, by the first node in cooperation with the second node, a logical link of the one or more logical links between each first cell of the one or more first cells and each second cell of the one or more second cells.

10. The method of claim 7, further comprising performing, by the first node, carrier aggregation by:

receiving the data from the central unit;

transmitting a first portion of the data to the second node to send to the user equipment over the physical link; and transmitting a second portion of the data to the user equipment using the one or more first cells.

11. The method of claim 7, further comprising performing, by the first node, carrier aggregation by:

receiving first data from the second node over the physical link, the first data being received by the second node from the user equipment using the one or more second cells;

receiving second data by the first node using the one or more first cells; and transmitting the first and second data to the central unit.

12. A non-transitory computer-readable medium storing executable that, when executed by one or more processing devices, causes the one or more processing devices to perform a method comprising:

(a) detecting, by a first node, user equipment located within one or more first cells of a cellular communication network implemented by the first node and within one or more second cells of the cellular communication network implemented by a second node, the first and second nodes being remote from one another and connected by a physical link; and in response to (a):

establishing, by the first node, one or more logical links between the one or more first cells and the one or more second cells;

creating, by the first node, a network a level 2 (L2) or a level 3 (L3) network connection between the first node and the second node;

in response to latency of the physical link being below a threshold and a status of the physical link being acceptable, performing carrier aggregation with respect to data transmitted between the user equipment and a central unit, the carrier aggregation being performed over the physical link using the one or more logical links, the central unit being remote from the first node and the second node; and in response to the latency of the physical link being above the threshold and the status of the physical link being unacceptable, ceasing performing carrier aggregation over the physical link using the one or more logical links.

* * * * *